United States Patent
Lal et al.

[11] Patent Number: 5,834,111
[45] Date of Patent: Nov. 10, 1998

[54] MULTILAYERED MAGNETIC RECORDING MEDIUM WITH COERCIVITY GRADIENT

[75] Inventors: Brij Bihari Lal, San Jose; Tadashi Shinohara, Fremont, both of Calif.

[73] Assignee: HMT Technology Corporation, Fremont, Calif.

[21] Appl. No.: 252,664

[22] Filed: May 31, 1994

[51] Int. Cl.$^6$ ........................................................ G11B 5/66
[52] U.S. Cl. .......................... 428/332; 428/336; 428/611; 428/678; 428/667; 428/694 T; 428/694 TM; 428/694 TP; 428/694 TS; 428/900; 204/192.1
[58] Field of Search ................ 428/694 T, 694 TM, 428/694 TP, 694 TS, 332, 336, 611, 900, 678, 667; 204/192.1

[56] References Cited

U.S. PATENT DOCUMENTS

| | | | |
|---|---|---|---|
| 5,227,212 | 7/1993 | Ahlert | 360/97.01 |
| 5,370,928 | 12/1994 | Funabashi et al. | 428/336 |
| 5,462,796 | 10/1995 | Teng et al. | 428/336 |
| 5,558,945 | 9/1996 | Miyazaki | 428/611 |
| 5,580,667 | 12/1996 | Lal et al. | 428/610 |
| 5,607,740 | 3/1997 | Noda | 428/65.3 |

FOREIGN PATENT DOCUMENTS

| | | |
|---|---|---|
| 372218 | 7/1973 | Japan . |
| 5856228 | 5/1989 | Japan . |
| 4021921 | 1/1992 | Japan . |
| 4129029 | 4/1992 | Japan . |
| 5094612 | 4/1993 | Japan . |
| 5114128 | 5/1993 | Japan . |
| 6139555 | 5/1994 | Japan . |

OTHER PUBLICATIONS

Cord, B., et al., "Sputtering of High Coercivity/Low Noise CoCrTa Bilayered Hard Disks in Production Systm", *IEEE Trans. Magn.* 29:3694 (1993).

Fisher, R.D., et al., "Effect of RF Substrate Bias on Crystalline Orientation of Chromium and Magnetic Characteristics of 84% Co–16% Cr Films", *IEEE Trans. Magn.* 26(1):109 (1990).

Hata, H., et al., "Magnetic and Recording Characteristics of Multilayer CoNiCr Thin Film Media", *IEEE Trans. Magn.* 26(5):2709 (1990).

Hata, H., et al., "Low–Noise Media Using Double–Layer CoNiCr Thin Films for Longitudinal Recording", *J. Appl. Phys.* 67(9):4692 (1990).

Pressesky, J., et al., "Crystallography and Magnetic Properties of CoCrTa Films Prepared on Cr Underlayers with Different Substrate Bias Conditions", *J. Appl. Phys.* 69(8):5163 (1991).

Lu, M., et al., "Effects of RF Bias on the Texture, Magnetics, and Recording Properties of RF Sputtered CoCr/Cr Longitudinal Thin Film Media", *IEEE Trans. Magn.* 26(5):1581 (1990).

Ohkoshi, M., and Kusuda, T., "Effect of Negative Substrate Bias on the Film Structure and Magnetic Properties in Sputter–Deposited Co–Cr Films", *J. Vac. Sci. Technology* 5(5):2859 (1987).

*Primary Examiner*—Leszek Kiliman
*Attorney, Agent, or Firm*—Peter J. Dehlinger; Judy M. Mohr

[57] ABSTRACT

A bilayer magnetic recording medium having first and second magnetic recording layers separated by a nonmagnetic isolation layer is disclosed. The medium is characterized by a high coercivity, low noise and an improved overwrite. In producing the medium, the second magnetic layer is deposited under sputtering conditions effective to produce a higher coercivity.

5 Claims, 7 Drawing Sheets

MULTILAYERED MAGNETIC RECORDING MEDIUM WITH COERCIVITY GRADIENT

FIELD OF THE INVENTION

The present invention relates to a multilayered magnetic recording medium having a coercivity gradient and to a method of producing the medium.

REFERENCES

Hata, H., et al., *J. Appl. Phys.,* 67(9), 4692 (1990a)
Hata, H., et al., *IEEE Trans. Magn.,* 26(5), 2709 (1990b).
Cord, B., et al., *IEEE Trans. Magn.,* 29, 3694 (1993).
Yogi, T. et al., *IEEE Trans. Magn.,* 26, 2271 (1991).

BACKGROUND OF THE INVENTION

Multi-layer magnetic recording media for longitudinal recording that are fabricated with a non-magnetic isolation layer, or interlayer, have improved recording properties, mainly due to decoupling of the noise sources in the individual magnetic layers. The improved recording characteristics include an increased signal-to-noise ratio and coercivity along with a reduction in coercive squareness and remanence thickness product (Hata, 1990a, 1990b).

Multi-layer media, and in particular bilayer media, are fabricated by sequentially sputtering onto a substrate a first magnetic layer, an isolation layer, and a second magnetic layer. Typically the uncoated substrate is first heated and the layers are then deposited. During deposition the preheated substrate cools and, as a result of this cooling, the second magnetic layer is deposited at a lower substrate temperature than the first magnetic layer.

This difference in temperature at which the magnetic layers are deposited results in the two layers having different magnetic recording properties, as temperature is a well known factor affecting the magnetic properties. Typically, the magnetic layer sputtered at the higher temperature has a higher coercivity than the magnetic layer deposited at the lower temperature (Cord). Bi-layer media with a higher coercivity in the first magnetic layer and a lower coercivity in the second, upper magnetic layer have poor overwrite performance as the read\write head flux is not able to saturate the medium completely. Other recording properties may also be compromised.

An additional consequence of media fabricated with an isolation layer is that the reduction in exchange coupling, which is necessary for better noise performance, leads to a drop in coercive squareness, S*. A reduced S* in low-noise media also results in degradation of overwrite (Yogi).

SUMMARY OF THE INVENTION

It is, therefore, an object of the invention to provide a multi-layer magnetic recording medium with low media noise characteristics and with improved overwrite performance.

It is a related object of the invention to provide a method of fabricating such a medium by controlling the coercivity of the magnetic recording layers.

In one aspect, the invention includes an improvement in a thin-film magnetic recording medium having a substrate, a chromium underlayer formed on the substrate, a multilayer magnetic film containing first and second magnetic layers separated by an isolation layer, and a wear-resistant overcoat. The improvement includes a higher coercivity in the second layer than in the first layer, and medium properties characterised by greater coercivity and higher overwrite compared to a medium having the same coercivity in both magnetic layers.

Preferably, the coercivity of the medium is greater than about 1600 Oe and the coercivity of the second magnetic layer is at least about 100 Oe greater than the first magnetic layer.

Preferably, the first and second magnetic layers each have a thickness between about 100 and 350 Å, and more preferably between about 250–350 Å; the first and second magnetic layers are each composed of the same alloy, in one embodiment; and this alloy is composed of 70–90 percent cobalt, 4–20 percent chromium and 2–10 percent tantalum.

The isolation layer, preferably, has a thickness between 5–20 Å, and more preferably between 10–20 Å.

In one embodiment, the greater coercivity of the second magnetic layer is a result of a voltage bias applied to the substrate during sputter deposition of the second magnetic layer. In another embodiment, the greater coercivity of the second magnetic layer is due to a sputter-pressure differential during sputter deposition of the first and second magnetic layers.

In another aspect, the invention includes a method of producing a magnetic recording medium on a substrate having an annular surface and an underlayer formed on the substrate surface. The method includes sputtering magnetic alloy material from a target onto the substrate surface to form a first magnetic layer on the underlayer; sputtering a non-magnetic isolation layer from a target onto the first magnetic layer; and sputtering magnetic alloy material from a target onto the isolation layer to form a second magnetic layer. The second magnetic layer is sputtered under sputtering conditions related to sputtering pressure and/or DC bias on the substrate which produce a greater coercivity in the second magnetic layer, when the two magnetic layers have the same alloy composition and thickness.

Preferably, the coercivity of the medium is greater than 1600 Oe and the coercivity of the second layer is at least about 100 Oe greater than that of the first magnetic layer.

In one embodiment, the sputtering conditions used in forming the second magnetic layer include a voltage bias that is between −30 to −500 V.

In one embodiment, the sputtering conditions used in forming the second magnetic layer include a sputtering pressure that is in the range 2–8 mTorr and is lower than that used in forming the first magnetic layer.

In a preferred embodiment of this aspect, (a) the first and second magnetic layers are composed of an alloy containing between 70–90 percent cobalt, 4–20 percent chromium and 2–10 percent tantalum; (b) the first and second magnetic layers each have a thickness between about 100 and 350 Å; and (c) the isolation layer is composed of chromium and has a thickness between 5–20 Å.

These and other objects and features of the invention will be more fully appreciated when the following detailed description of the invention is read in conjunction with the accompanying drawings.

DETAILED DESCRIPTION OF THE INVENTION

I. Thin-Film Medium

Figure 1:
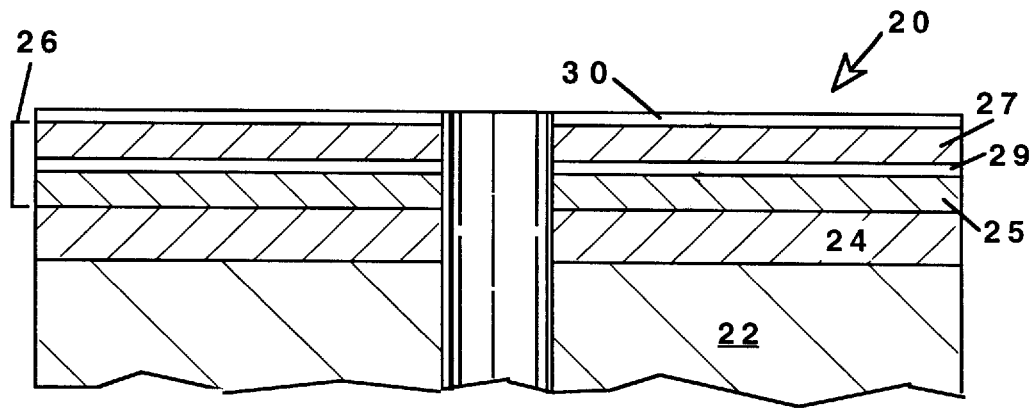
FIG. 1 is a sectional view of a thin-film medium formed in accordance with the invention.

FIG. 1 shows in cross sectional view, a fragmentary portion of a thin-film medium 20 formed in accordance with one embodiment of the present invention. The medium generally includes a rigid disk-like substrate 22, and forming successive thin-film layers over the substrate, a crystalline underlayer 24, a multilayered magnetic film 26, and a protective overcoat 30. Film 26 is composed of a first, or lower, sputtered magnetic thin-film layer 25, a second, or upper, sputtered magnetic thin-film layer 27, and a nonmagnetic isolation layer 29 separating the first and second magnetic layers.

The substrate may be a textured substrate, such as a conventional surface-coated, textured aluminum substrate of the type used commonly for digital recording medium, or a textured glass or ceramic substrate. Typically, the substrate is first plated with a selected alloy plating, such as a nickel/phosphorus plating, to achieve a requisite surface hardness.

The sputtered crystalline underlayer is preferably a sputtered chromium underlayer having a thickness between about 300–3,000 Å. Chromium-containing alloys, such as CrV, CrGd and CrSi may also be suitable underlayer materials, as may a tungsten underlayer.

The first and second magnetic thin-film layers 25, 27 are preferably formed of a cobalt-based alloy, that is an alloy containing at least 50% cobalt. Exemplary thin-film alloys include binary alloys and ternary alloys, such as Co/Cr, Co/Ni, Co/Cr/Ta, Co/Ni/Pt, or Co/Cr/Ni, and quaternary and five-element alloys, such as Co/Ni/Cr/Pt, Co/Cr/Ta/Pt, Co/Cr/Ta/Pt/B, or Co/Cr/Ni/Pt/B. In one general embodiment, the two magnetic layers are both formed of the same magnetic alloy. An exemplary alloy in this embodiment is a Co/Cr/Ta alloy containing 70–90 atomic percent cobalt, 5–20 atomic percent chromium, and 2–10 atomic percent tantalum.

As will be described below, the first and second magnetic layers are deposited under conditions selected to result in the first magnetic layer having a coercivity that is lower than the second magnetic layer. In one embodiment, the coercivity of the medium is greater than about 1600 Oe and the coercivity of the second magnetic layer is at least about 100 Oe greater than the coercivity of the first magnetic layer.

The nonmagnetic isolation layer 29, or interlayer, of the thin-film structure is disposed between the first and second magnetic layers. The nonmagnetic metal in the isolation layer may be Cr, Ti, Mo, Zr, Al, W, Si, Nb, Ta, Y, Hf, Au, Ag, V, B, Gd, Cu, Re or Ru. Preferably, the isolation layer is formed of chromium or a chromium-based alloy. The isolation layer has a preferred thickness between about 5–20 Å, and more preferably between 10–20 Å.

Still with reference to FIG. 1, the overcoat 30 in the thin-film medium is preferably a carbon layer formed by sputtering carbon onto the uppermost magnetic layer, under conditions in which the carbon is deposited in a predominantly diamond-like structure. The overcoat thickness is preferably between about 100–300 Å.

As will be seen below, the medium is characterized by high coercivity, i.e., at least 1,600 Oersteds (Oe), and preferably greater than 1,800 Oe, and by an overwrite of greater than about 20 –dB and that is greater than a standard bilayer medium.

II. Method of Producing the Medium

Figure 2:
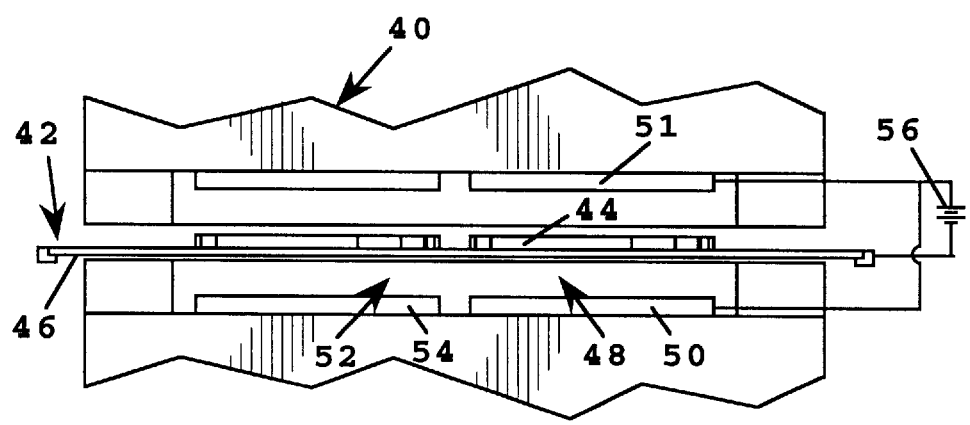
FIG. 2 is a schematic illustration of a portion of a sputtering apparatus used in forming the medium of the invention.

FIG. 2 shows, in schematic view, a portion of a sputtering apparatus 40 which is used, in the method of the invention, for producing the thin-film medium described in Section I. The apparatus includes a vacuum chamber 42 having at least four stations at which sputtering or heating operations occur. A heating station (not shown) at the upstream end of the chamber has a plurality of infrared lights which are arrayed for heating both sides of a substrate, such as substrate 44, carried through the station in the chamber on an aluminum disc holder 46.

Just downstream of the heating station is a first sputtering station 48 at which the crystalline underlayer is formed on a substrate, in a manner to be described. The station includes a pair of targets, such as targets 50, 51, effective to sputter chromium onto opposite sides of a substrate, such as substrate 44. The targets in station 48 are preferably composed of pure chromium or of a chromium alloy containing predominantly chromium.

Downstream of the first sputtering station are sputtering stations (not shown in FIG. 2) at which are sputtered (1) the first magnetic layer, (2) the isolation layer, and (3) the second magnetic layer. These stations include a pair of sputtering targets appropriate for sputtering the desired material onto the substrate. The targets for deposition of the magnetic layers are formed of a cobalt-based alloy like those described above, and preferably one containing 70–90 percent Co, 5–20 atom percent Cr, and 2–10 atom percent Ta. Targets in the station for sputtering the isolation layer are formed of a nonmagnetic material listed above, preferably chromium or a chromium based alloy. The alloys are formed and shaped for use as sputtering targets by conventional metallurgical methods.

Also included in the apparatus is a DC power source 56 for placing a selected voltage potential between the sputtering targets, such as targets 50, 51 and the substrate, such as substrate 44, positioned between the targets. More specifically, the power source is designed to place a DC negative bias on the substrate of –30 to –600 volts with respect to the confronting target voltage in both chamber 48, where chromium underlayer sputtering occurs, and the downstream chamber where the first magnetic thin-film layer sputtering occurs.

The carbon overcoat in the medium is produced by sputtering from a graphite target in a final sputtering station (not shown) in the apparatus.

The basic sputtering apparatus is preferably a commercial system, such as in available from Varian (Santa Clara, Calif.), Circuits Processing Apparatus (Fremont, Calif.), ULVAC (Japan), ANELYA (Japan), Leybald Heraeus (Germany), VACTEC (Boulder, Co.), or Materials Research Corporation (Albany, N.Y.). These systems are double-sided, in-line, high-throughput machines having two interlocking systems, for loading and unloading.

In operation, the sputtering chamber is evacuated to pressure of about $10^{-7}$ Torr, and argon gas is introduced into the chamber to a final sputtering pressure of 5–30 mTorr.

The substrate is heated in the heating station to a selected temperature before advancing into the two sputtering chambers. The heating conditions in the apparatus are preferably adjusted to achieve a substrate temperature of between about 220° C. and 270° C., and preferably about 260° C. The heated substrate is moved into the first sputtering chamber, and the chromium underlayer is sputtered onto the textured disc surface. The chromium underlayer is deposited to a thickness of between about 100–3,000 Å.

After formation of the underlayer, the substrate is moved downstream on a disc holder into the next sputtering chamber, where the first magnetic layer is sputtered onto the underlayer. The thickness of the magnetic layer is preferably between about 100–350 Å, and more preferably 250–350 Å.

After formation of the first magnetic thin film, the substrate is carried on the disc holder toward another sputtering station where the nonmagnetic isolation layer is deposited. This layer is sputtered to a final thickness of between about 5–25 Å, and as will be seen below, preferably to a thickness of between 5–20 Å, and more preferably between 10–20 Å.

For deposition of the isolation layer, a narrow slit-design cathode may be used to uniformly deposit a layer of this thickness. In this technique, a shield or baffle-like structure having a narrow slit opening is placed over the sputtering target. During deposition, target alloy material is deposited onto the substrate from the target area exposed by the narrow slit. The shield or baffle may be composed of aluminum or a similar material. One exemplary shield has dimensions of 55.9 cm×12.1 cm with a slit 1.3 cm wide positioned in the center of the shield.

Also in an in-line pass-by sputtering system, multi-layered media can be produced by using a pair of chromium targets and a pair of magnetic targets. The disc holder can be oscillated in backward and forward directions to deposit multi-layers of magnetic material and of chromium. The same pair of chromium targets may be used to deposit both the underlayer of the medium and the isolation, or interlayers.

The second magnetic layer is deposited over the nonmagnetic isolation layer in another sputtering station. This layer is deposited to the same thickness range as the first magnetic layer, that is between about 100–350 Å, and more preferably 250–350 Å.

Figure 3:
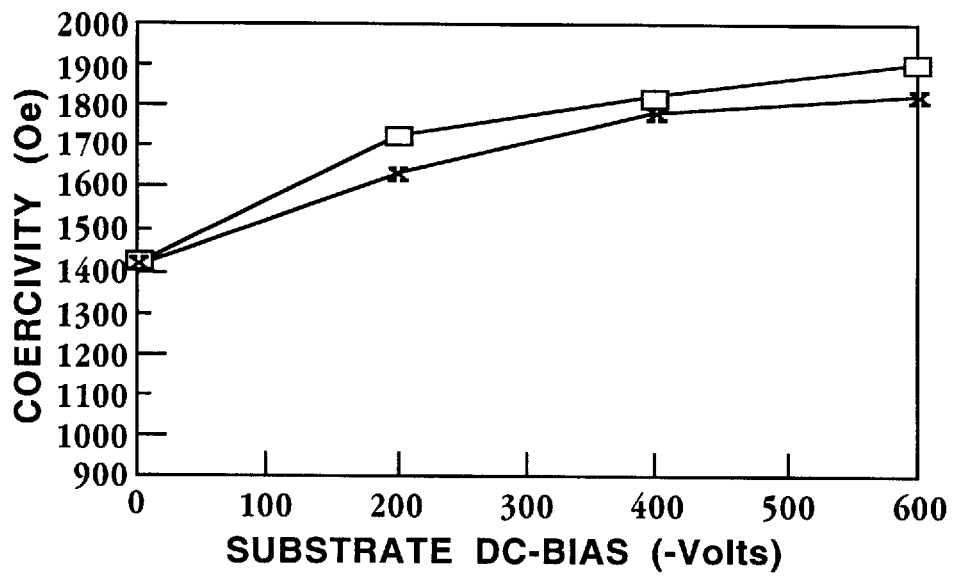
FIG. 3 shows the effect of substrate bias applied during sputtering of a magnetic thin film layer (x symbols) and during sputtering of both the underlayer and the magnetic layer (□)

According to an important feature of the invention, the coercivity of the first and second magnetic layers, and in particular the second layer, are controlled during sputter deposition. In one embodiment, sputtering of the second magnetic layer is carried out at a substrate voltage potential, measured with respect to target, of −30 to −500 Volts, preferably between −200 to −300 Volts. FIG. 3 shows the effect of substrate bias on coercivity for media formed with a 300 Å Cr underlayer and a single 660 Å magnetic thin-film layer composed of a cobalt-based alloy. Media formed by substrate bias during sputtering of the magnetic thin-film layer ("x" symbols) and during sputtering of both the chromium underlayer and magnetic thin-film layer (open rectangles) are shown. As seen, the resulting media coercivity is dependent on substrate negative voltage.

Figure 4:
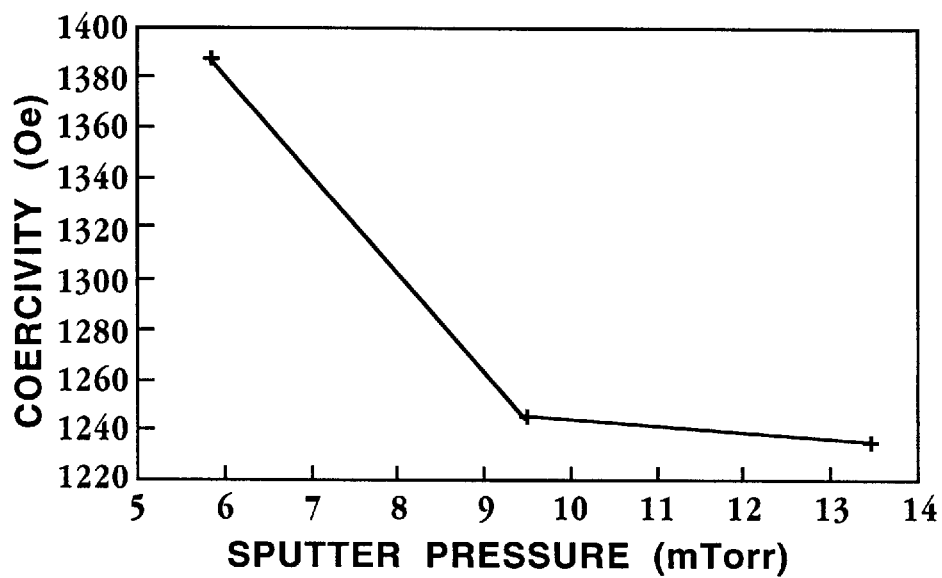
FIG. 4 shows the effect of sputtering pressure on coercivity of media formed in accordance with the present invention.

In another embodiment of the present invention, the coercivity of the magnetic layers is controlled by the sputtering pressure. After evacuation of the sputtering chamber, argon gas, or another inert gas, is introduced into the chamber to a final sputtering pressure of between 2–30 mTorr. In one embodiment, the first, or lower, magnetic layer is formed at a sputtering pressure between 5–30 mTorr, and preferably between about 10–20 mTorr. The second, or upper, magnetic layer is deposited at a lower sputtering pressure, typically between 2–8 mTorr, or about 5 mTorr lower than the sputtering pressure of the first magnetic layer. FIG. 4 shows the change in coercivity in a Co/Cr/Ta magnetic film sputtered to a thickness of 500 Å at sputtering pressures between 6–13.5 mTorr. As seen, there is a sharp drop in coercivity above about 9–10 mTorr.

As will be seen below, media formed where the second magnetic layer has a higher coercivity than the first magnetic layer have improved recording characteristics relative to a monolayer medium or to a standard bilayer medium where the coercivity of the second magnetic layer is lower than the first magnetic layer.

In a final sputtering chamber a protective overcoat is applied onto the uppermost magnetic thin film layer. The overcoat may be composed of carbon, silicon oxide, silicon nitride, or the like.

It will be appreciated that the magnetic recording medium may contain additional magnetic layers underlying the two layers shown. Each additional layer is separated from the next by a thin isolation layer. The coercivity of the underlying magnetic layer or layers may be the same as either the first, lower magnetic layer or the second, upper magnetic layer.

III. Properties of the Medium

Bulk magnetic properties were determined by vibrating sample magnetometry. Magnetic recording testing was carried out on a Guzik Model RWA 221, using a thin-film inductive reading and recording head with a gap length of 14 $\mu$in., a gap width of 472 $\mu$in., and a flying height of 4.5 $\mu$in. The head inductance was 1.1 $\mu$Henry and resistance, 30 ohms.

Figure 5A:
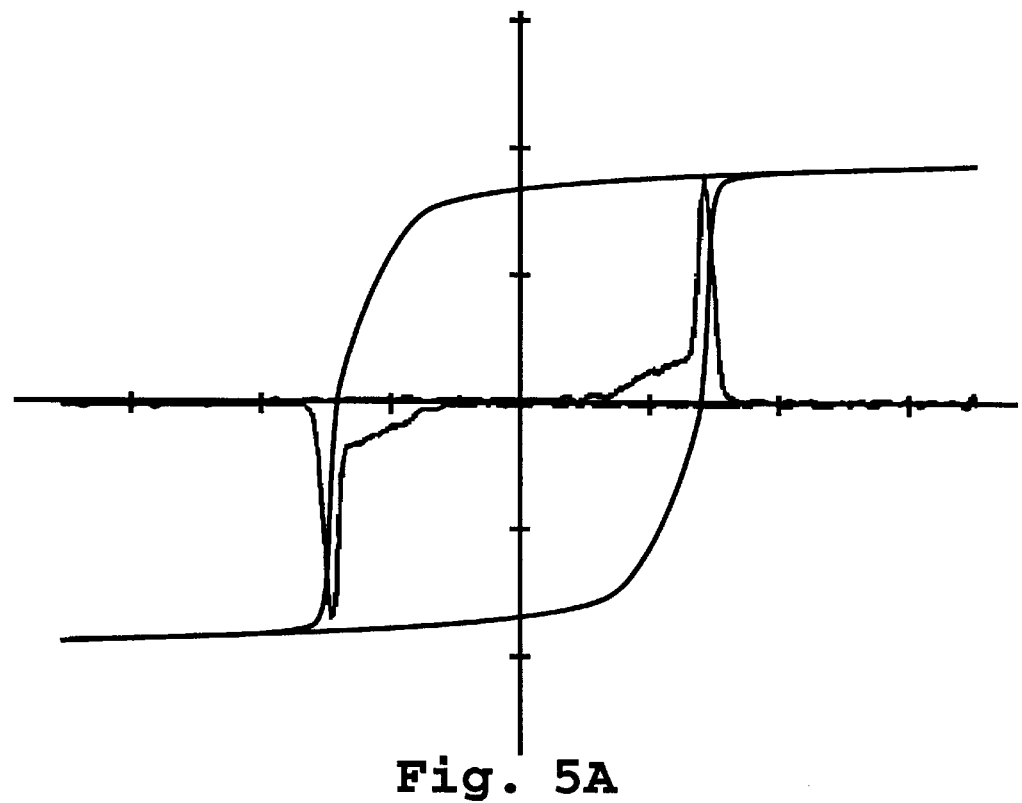
FIGS. 5A and 5B are hysteresis loops of a medium having a single magnetic layer (5A) and a of bilayered medium formed according to the present invention (5B)
Figure 5B:
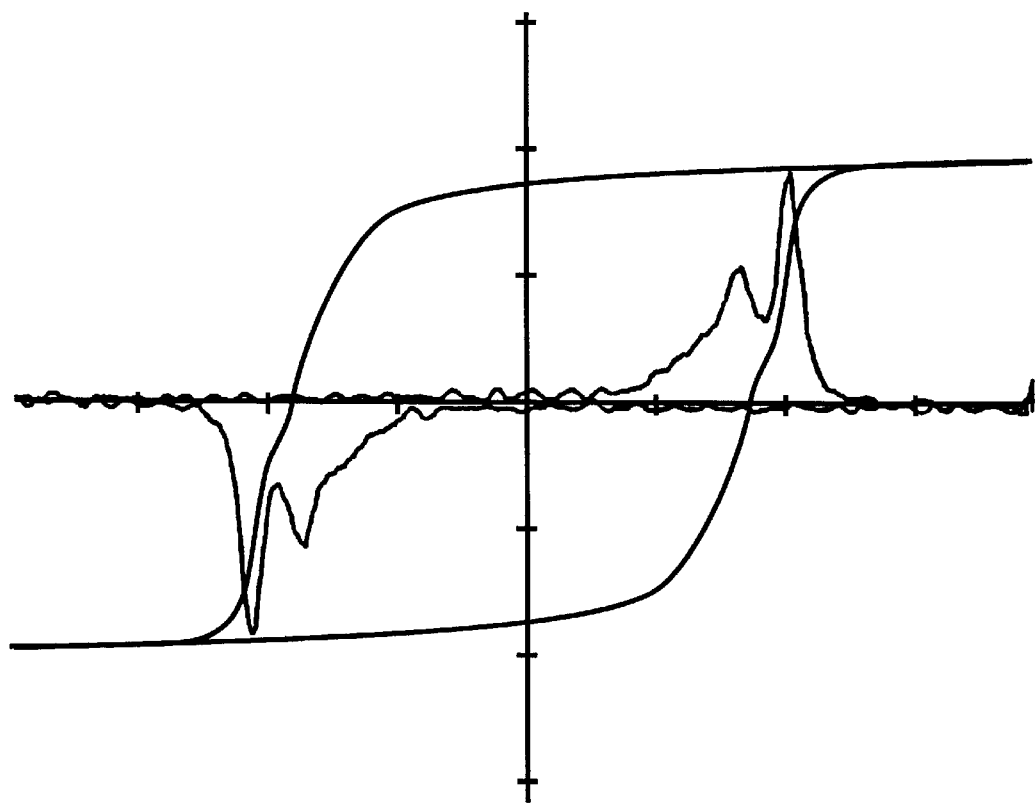

FIG. 5A is an M-H hysteresis loop for a magnetic recording medium, formed as described in Example 1, having a single Co/Cr/Ta magnetic recording layer deposited over a chromium underlayer. FIG. 5B is a hysteresis loop for a bilayer medium formed as described in Example 3, in accordance with one embodiment of the invention. The first magnetic layer in the standard bilayer media has a lower coercivity than the second magnetic layer, as seen in the non-integrated hysteresis loop (d$\phi$/dt). In FIG. 5B, the medium was formed with a −250 Volt substrate bias during sputtering of the second magnetic layer so that the second magnetic layer has a higher coercivity than the first magnetic layer.

Table 1 compares the recording characteristics of media prepared according to Examples 1, 2, and 3, that is a medium with a single magnetic recording layer (monolayer), a standard bilayer medium where the first magnetic layer has a higher coercivity than the second magnetic layer, and the new bilayer medium of the present invention where a negative bias is applied to the substrate during deposition of the second magnetic layer.

Overwrite (measured in −dB) is a measure of the over bias required to completely erase a lower frequency signal with a higher frequency one. As seen in Table 1, the overwrite of the bilayer medium formed in accordance with the invention is about 5 dB higher in comparison to the standard bilayer medium. Also, the HF amplitude and resolution are higher and the pulse width (PW-50) is lower than the standard bilayer media.

TABLE 1

| Type of Medium | Cr-interlayer (Å) | Hc (Oe) | HF (uV) | Res. (%) | PW-50 (nsec) | OW (−dB) | SNR (dB) at 66.3 KFCI |
|---|---|---|---|---|---|---|---|
| Mono-layer | 0 | 1577 | 510 | 77.5 | 59.1 | 26.3 | 14.8 |
| Stnd. Bi-layered | 11 | 1513 | 430 | 76.2 | 64.1 | 19.1 | 19 |
| New bi-layered | 11 | 1906 | 480 | 79.2 | 57.6 | 24.1 | 20 |

Figure 6:
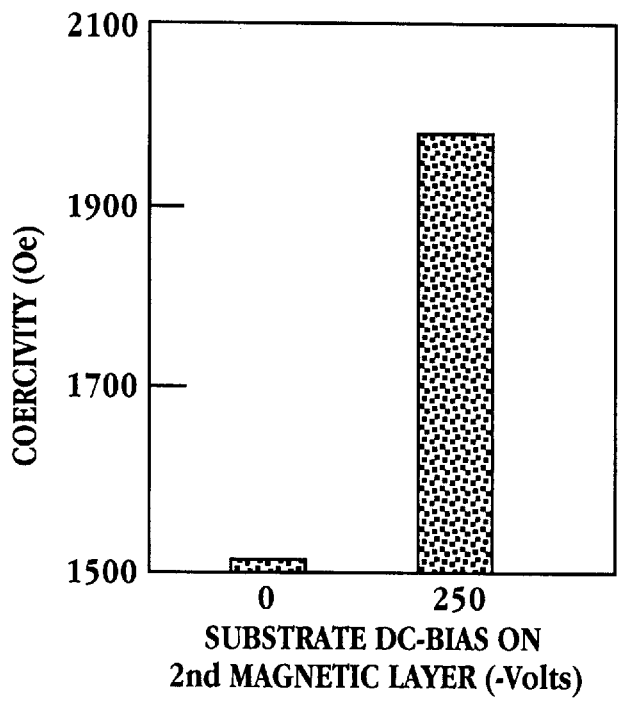
FIG. 6 shows the effect of substrate bias on coercivity.

According to one embodiment of the invention, a negative voltage bias is applied to the substrate during deposition of the second magnetic layer. FIG. 6 shows that such a bias increases the coercivity of the bilayer media significantly.

Figure 7:
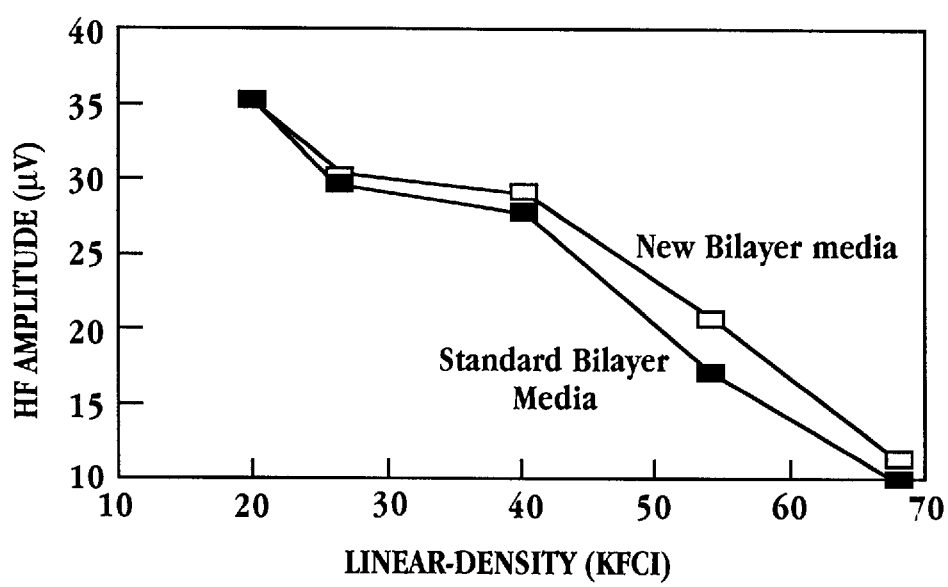
FIG. 7 is a plot of HF amplitude, in $\mu V$, vs. recording density, in KFCI, for a standard bilayer medium and for the bilayered medium of the present invention.
Figure 8:
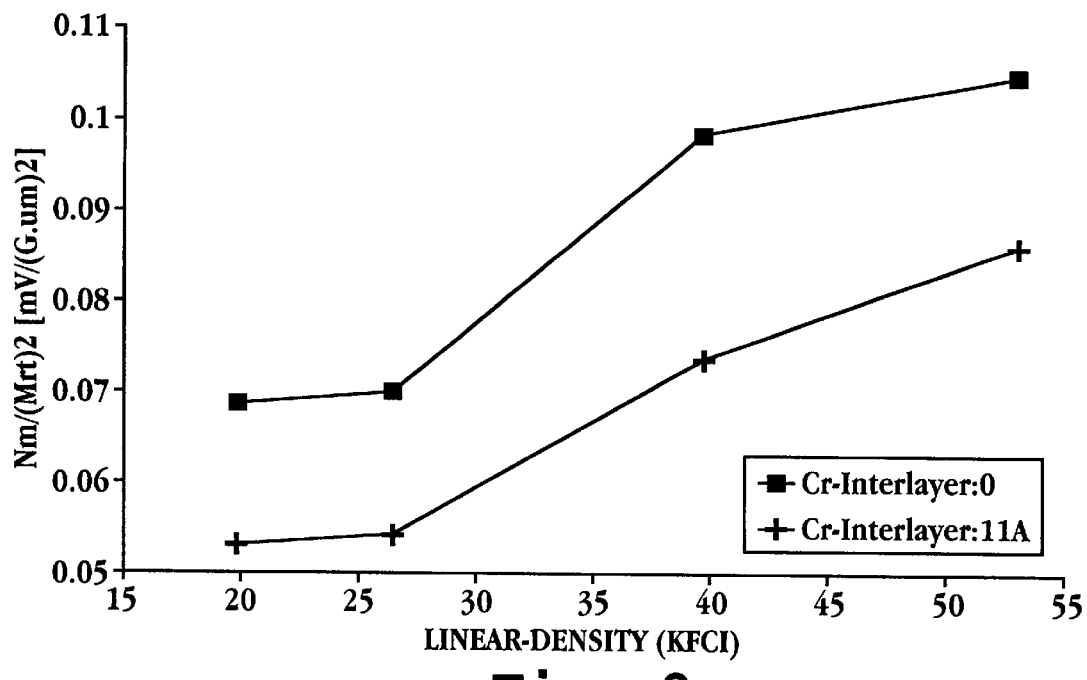
FIG. 8 is a plot of media noise as a function of linear recording density, in KFCI, for a monolayer medium (■) and for a bilayer medium prepared according to the present invention (+)

FIG. 7 plots HF amplitude as a function of recording density for standard bilayer media (formed according to Example 2) and for the new bilayer media (formed according to Example 3). As seen in FIG. 7, the new bilayer media (□) produce higher signal output at higher recording densities in comparison to standard bilayer media (■). FIG. 8 shows media-noise as a function of recording density for a monolayer medium (■) and for a bilayer medium (+) formed according to Example 3 where the chromium isolation layer is 11 Å in thickness. Media noise of the bilayer media formed according to the invention is lower than the monolayer medium.

Figure 9:
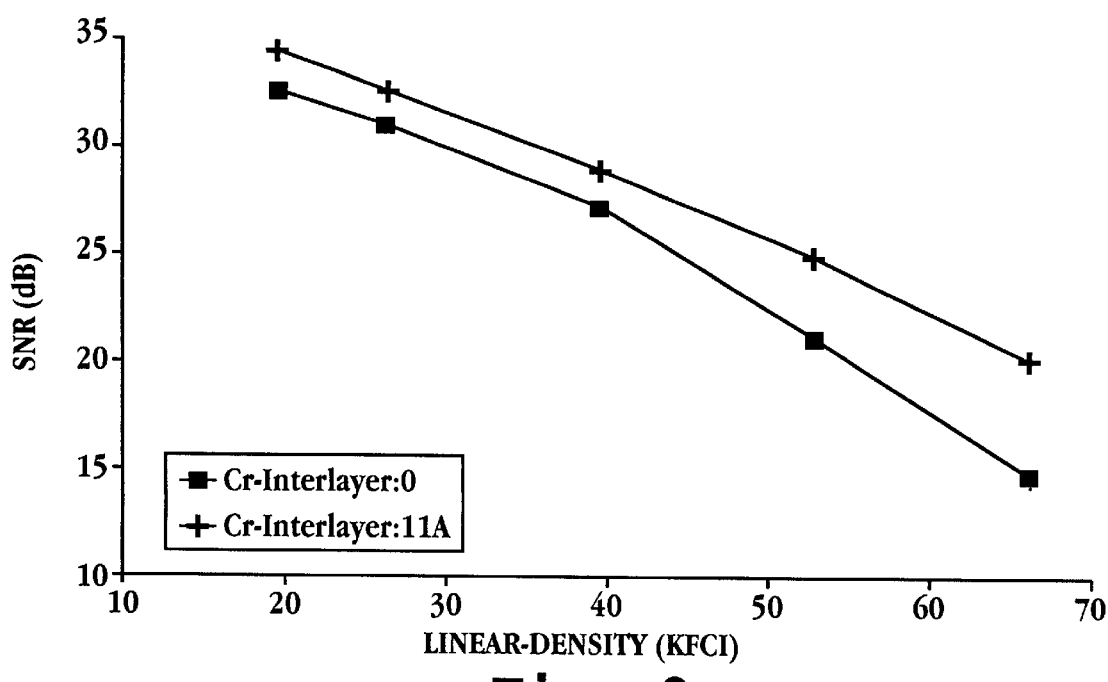
FIG. 9 shows signal-to-noise ratio, in dB, against linear recording density, in KFCI, for a monolayer medium (■) and for a bilayer medium according to the present invention (+)

FIG. 9 is a plot of signal-to-noise ratio (SNR) as a function of recording density for a monolayer medium formed according to Example 1 (■) and for a bilayer medium with a chromium isolation layer 11 Å in thickness (+ symbols), formed as described in Example 3. The bilayer medium, formed such that the coercivity of the second magnetic is higher than that of the first layer, has an improved SNR relative to the monolayer medium at all recording densities.

It is clear from the data presented above, that bilayer media formed with a negative voltage bias applied to the substrate during deposition of the second magnetic layer results in improved recording properties. The higher coercivity and the reduced media noise are accompanied by an overwrite that is at least 5 dB higher relative to standard bilayer media.

According to another embodiment of the invention, the sputtering pressure can also be selected to control the coercivity of the second magnetic layer. Table 2 compares the magnetic recording properties, measured at the outer diameter of the disc, of media formed as described in Examples 2 and 4. In the standard bilayer media, the first magnetic layer has a higher coercivity than the second magnetic layer. The new bilayer medium (Example 4) has a lower coercivity in the first magnetic layer than in the second, due to a sputtering pressure differential during deposition of the two layers.

TABLE 2

| Type of Medium | Cr-interlayer (Å) | HF (uV) | Res. (%) | PW-50 (ns) | OW (−dB) | SNR(dB) at 66.3 KFCl | BS (ns) |
|---|---|---|---|---|---|---|---|
| Stnd. Bi-layer | 11 | 480 | 77.4 | 60.4 | 20.0 | 30.7 | 6.9 |
| New bi-layer | 11 | 490 | 78.2 | 59.3 | 23.2 | 28.5 | 5.5 |

As seen in Table 2, the overwrite (OW) of the new bilayer medium is about 14% higher than the standard bilayer medium.

Table 3 and FIGS. 10–11 below show recording characteristics as a function of thickness of the chromium isolation layer, or interlayer. The media were prepared according to Example 3, where a negative voltage was applied to the substrate during sputtering of the second magnetic layer. The sputtering conditions in forming the isolation layer are selected to produce a final thickness between about 5–20 Å, and preferably between about 10–20 Å. The isolation layer thickness is controlled by adjusting conventional sputter deposition parameters such as sputter pressure, target power, voltage, and deposition time.

Table 3 summarizes the static magnetic properties of new bilayer media having chromium isolation layers with thicknesses of 0, 11, and 14 Å. The coercive squareness (S*), magnetic remanence (Mrt) and orientation ratio (OR, $M_{r:cir}/M_{r:rad}$) of the new bilayer media do not change significantly in comparison to monolayer media.

TABLE 3

| Cr-Underlayer (Å) | Each Mag. Layer (Å) | Cr-Interlayer (Å) | VSM Data | | | |
|---|---|---|---|---|---|---|
| | | | Hc (Oe) | S* | Mrt (memu/cm$^2$) | OR |
| 1100 | 295 | 0 | 1621 | 0.82 | 3.72 | 1.58 |
| 1100 | 295 | 11 | 1926 | 0.77 | 3.62 | 1.49 |
| 1100 | 295 | 14 | 1887 | 0.76 | 3.58 | 1.46 |

Figure 10:
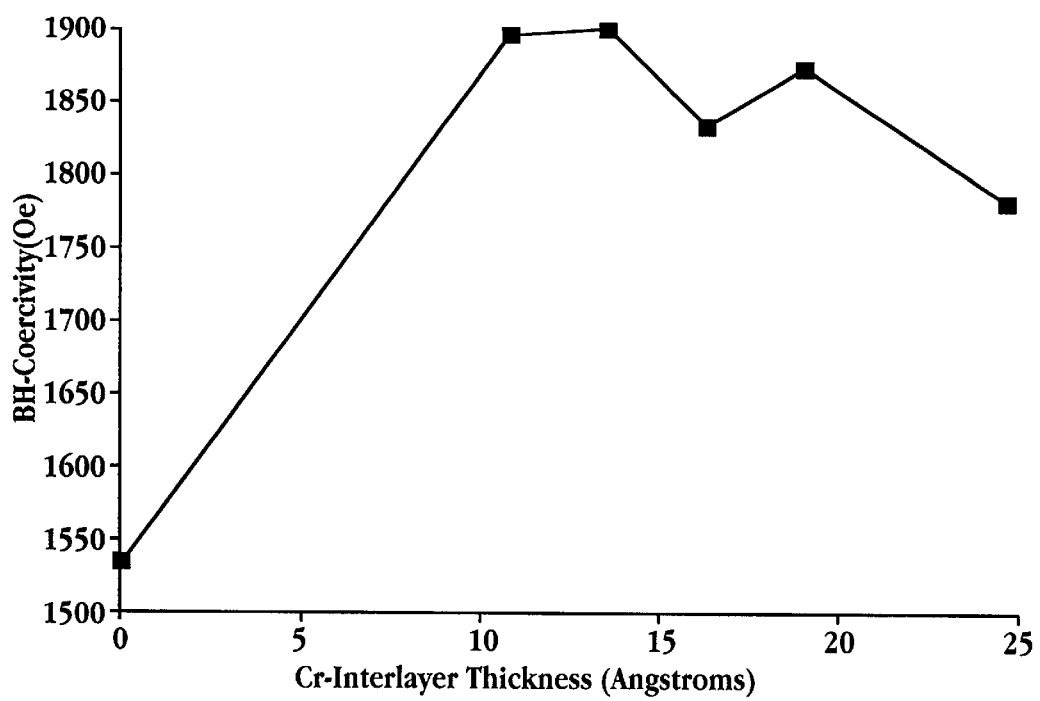
FIG. 10 is a plot of media coercivity, in Oe, as a function of thickness of the isolation layer, in Å.

FIG. 10 plots the coercivity of bilayer media formed with a negative bias applied during deposition of the second magnetic layer as a function of thickness of the chromium isolation layer. Above about 5 Å there is a significant increase in the coercivity with increasing thickness of the isolation layer.

Figure 11A:
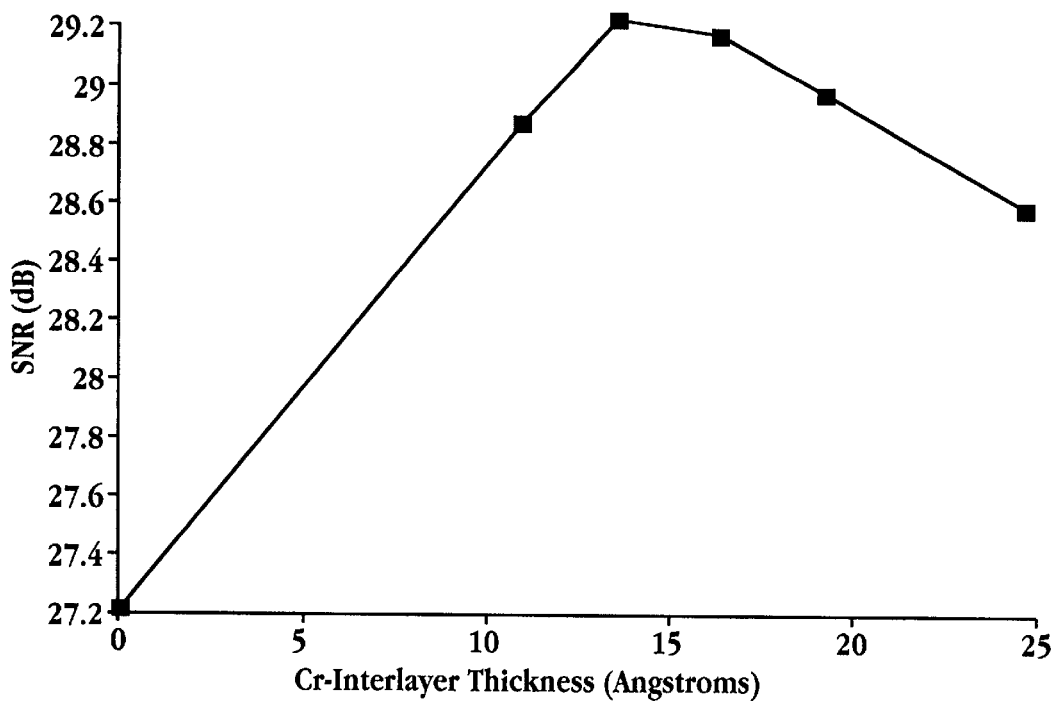
FIGS. 11A and 11B show signal-to-noise ratio, in dB, as a function of thickness of the isolation layer, in Å, measured at 40.3 KFCI (FIG. 11A) and at 66.3 KFCI (FIG. 11B).
Figure 11B:
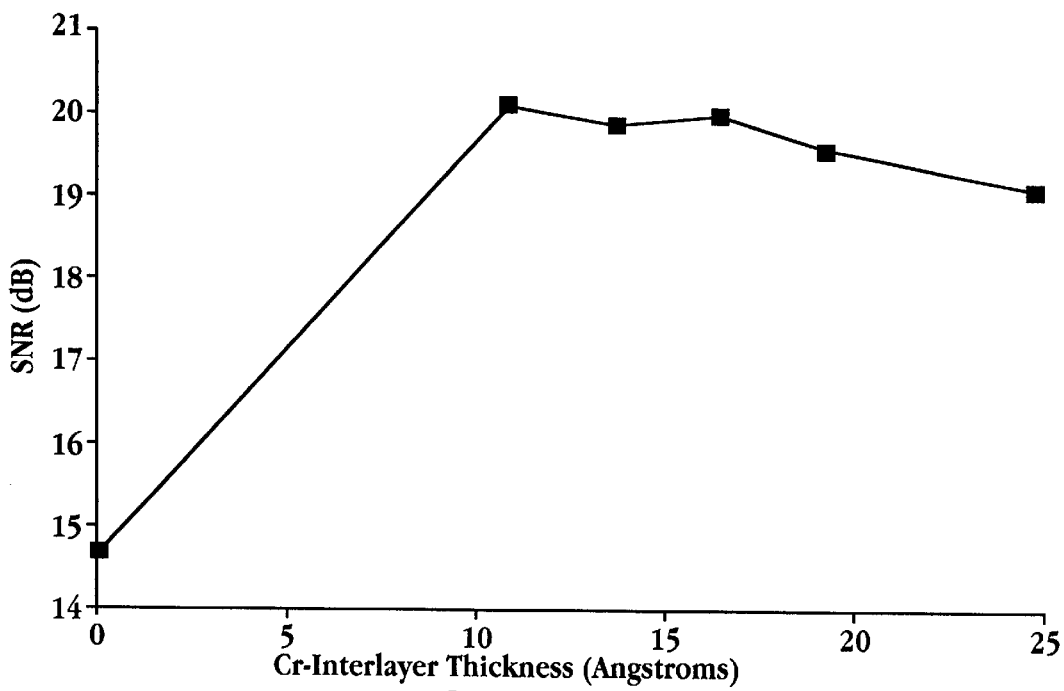

FIGS. 11A and 11B show the signal-to-noise ratio as a function of isolation layer thickness for media prepared as described in Example 3 and having a lower coercivity in the first magnetic layer than in the second layer. The SNR is measured at 40.3 KFCI and at 66.3 KFCI in FIGS. 11A and 11B, respectively. At both recording densities, the SNR improves with increasing thickness of the isolation layer, particularly in the 10–20 Å range.

Table 4 summarizes other recording properties for media prepared according to Example 3 with the thickness of the isolation layer varying from 0–25 Å. Improvements in resolution, pulse width and bit shift are observed as the thickness of the isolation layer increases between 10–20 Å.

TABLE 4

| Cr-Isolation Layer Thickness (Å) | Resolution (%) | PW-50 (ns) | BS (ns) |
| --- | --- | --- | --- |
| 0 | 98.7 | 90.8 | 7.5 |
| 10 | 101.2 | 87.1 | 6.4 |
| 15 | 101.3 | 88.8 | 7.4 |
| 20 | 101.3 | 90.2 | 8.0 |
| 25 | 100.1 | 90.9 | 8.6 |

From the foregoing, it will be appreciated how various objects and features of the invention are met. Multilayer media in general have an increased coercivity and reduced media noise relative to monolayer media. The bilayer medium of the invention maintains the improved coercivity and media noise characteristics while at the same time achieving improved overwrite performance, relative to standard bilayer media. This improvement in overwrite is observed for bilayer media produced (i) by applying a negative bias to the substrate during sputtering of the second magnetic layer and (ii) by depositing the second magnetic layer at a lower sputtering pressure than the first magnetic layer.

IV. EXAMPLES

The following examples are meant to illustrate, but in no way limit, the invention

EXAMPLE 1

Preparation of a Monolayer Magnetic Recording Medium

A thin-film magnetic medium was formed in an in-line pass-by DC-magnetron sputtering system by sputtering onto a 95 mm textured NiP/Al substrate. A chromium underlayer having a thickness of 1100 Å was deposited, followed by deposition of a CoCrTa (88:8:4) magnetic recording layer with a thickness of 590 Å. A protective carbon overcoat was sputtered over the magnetic recording layer. The background pressure in the vacuum chamber was about $10^{-7}$ Torr and the sputtering pressure was 5 mTorr of argon. The substrate was heated in vacuo to a temperature of approximately 250° C. prior to deposition of the films.

Magnetic recording characteristics of the medium are shown in Table 1 and in FIGS. 5A, 8 and 9.

EXAMPLE 2

Preparation of a Standard Bilayer Medium Having a High/Low Coercivity

A bilayer thin-film magnetic medium was formed in an in-line pass-by DC-magnetron sputtering system by sputtering onto a 95 mm textured NiP/Al substrate. A chromium underlayer having a thickness of 1100 Å was deposited, followed by deposition of (i) a CoCrTa (88:8:4) first magnetic recording layer with a thickness of 295 Å; (ii) a chromium isolation layer with a thickness between 5–25 Å; and (iii) a second magnetic recording layer of CoCrTa (88:8:4) with a thickness of 295 Å. A protective carbon overcoat was sputtered over the second magnetic recording layer. The background pressure in the vacuum chamber was about $10^{-7}$ Torr and the sputtering pressure was 5 mTorr of argon. The substrate was heated in vacuo to a temperature of approximately 260° C. prior to deposition of the films.

Magnetic recording characteristics of such media are shown in Tables 1 and 2 and in FIGS. 6 and 7.

EXAMPLE 3

Preparation of a Low/High Coercivity Bilayer Medium by Negative Substrate Biasing A bilayer thin-film magnetic medium was formed in an in-line pass-by DC-magnetron sputtering system by sputtering onto a 95 mm textured NiP/Al substrate. A chromium underlayer having a thickness of 1100 Å was deposited, followed by deposition of (i) a CoCrTa (88:8:4) first magnetic recording layer with a thickness of 295 Å; (ii) a chromium isolation layer with a thickness between 5–25 Å; and (iii) a second magnetic recording layer of CoCrTa (88:8:4) with a thickness of 295 Å. During sputter deposition of the second magnetic recording layer, a substrate DC-bias of −250 V was applied.

A protective carbon overcoat was sputtered over the second magnetic recording layer. The background pressure in the vacuum chamber was about $10^{-7}$ Torr and the sputtering pressure was 5 mTorr of argon. The substrate was heated in vacuo to a temperature of approximately 260° C. prior to deposition of the films.

Magnetic recording characteristics of such media are shown in Tables 1, 3 and 4 and in FIGS. 3, 5B, and 6–11.

EXAMPLE 4

Preparation of a Low/High coercivity Bilayer Medium by Sputtering Pressure Differential A bilayer thin-film magnetic medium was formed in an in-line pass-by DC-magnetron sputtering system by sputtering onto a 95 mm textured NiP/Al substrate. A chromium underlayer having a thickness of 1100 Å was deposited, followed by deposition of (i) a CoCrTa (88:8:4) first magnetic recording layer with a thickness of 295 Å; (ii) a chromium isolation layer with a thickness between 5–25 Å; and (iii) a second magnetic recording layer of CoCrTa (88:8:4) with a thickness of 295 Å. The sputtering pressures during deposition of the first and second magnetic recording layers were 15 and 5 mTorr, respectively.

A protective carbon overcoat was sputtered over the second magnetic recording layer. The background pressure in the vacuum chamber was about $10^{-7}$ Torr. The substrate was heated in vacuo to a temperature of approximately 260° C. prior to deposition of the films.

Magnetic recording characteristics of such media are shown in Table 2 and in FIG. 4.

Although the invention has been described with respect to particular embodiments, it will be apparent to those skilled in the art that various changes and modifications can be made without departing from the invention.

It is claimed:

1. A thin-film magnetic recording medium, comprising
    a substrate,
    a chromium underlayer formed on said substrate,
    a first magnetic layer sputter deposited on said underlayer,
    a chromium-containing isolation layer sputter deposited on said first magnetic layer, said isolation layer having a thickness of between 5–20 Å;
    a second magnetic layer sputter deposited on said isolation layer; and
    a wear-resistant overcoat,
    wherein said second magnetic layer has a higher coercivity than said first magnetic layer, and said medium is characterized by a greater coercivity and higher overwrite when compared to a medium having first and second magnetic layers which are separated by an isolation layer and which have the same coercivity.

2. The medium of claim 1, wherein the coercivity of said medium is greater than 1600 Oe and the coercivity of said second magnetic layer is at least about 100 Oe greater than that of said first magnetic layer.

3. The medium of claim 1, wherein said first and second magnetic layers each have a thickness between 100 and 350 Å.

4. The medium of claim 1, wherein said first and second magnetic layers are composed of an alloy, and said alloy forming each layer is the same alloy.

5. The medium of claim 4, wherein said alloy includes between 70–90 atomic percent cobalt, 4–20 atomic percent chromium and 2–10 atomic percent tantalum.

* * * * *